United States Patent
Deselaers

(10) Patent No.: US 12,228,455 B2
(45) Date of Patent: Feb. 18, 2025

(54) FLAME MONITOR

(71) Applicant: DURAG GmbH, Hamburg (DE)

(72) Inventor: Christian Deselaers, Schenefeld (DE)

(73) Assignee: DURAG GmbH (DE)

( * ) Notice: Subject to any disclaimer, the term of this patent is extended or adjusted under 35 U.S.C. 154(b) by 436 days.

(21) Appl. No.: 17/676,147

(22) Filed: Feb. 19, 2022

(65) Prior Publication Data

US 2022/0291050 A1    Sep. 15, 2022

(30) Foreign Application Priority Data

Mar. 15, 2021 (DE) .......................... 102021106263.2

(51) Int. Cl.
G01J 5/56 (2006.01)
G01J 5/00 (2022.01)

(52) U.S. Cl.
CPC ............... G01J 5/56 (2013.01); G01J 5/0018 (2013.01); *F23N 2223/08* (2020.01)

(58) Field of Classification Search
CPC .......................... F23N 2223/08; F23N 2227/16
(Continued)

(56) References Cited

U.S. PATENT DOCUMENTS 5,549,469 A * 8/1996 Wild ........................ F23N 5/123
431/75
2012/0061573 A1* 3/2012 Harchanko ............. F23N 5/082
250/339.15

(Continued)

FOREIGN PATENT DOCUMENTS

DE    19710206    9/1998
EP    2105669     9/2009
EP    3663646     6/2020

OTHER PUBLICATIONS

Durag brochure entitled D-LX 201 Compact flame monitor, Feb. 2019, (6 pages).

(Continued)

*Primary Examiner* — Ko-Wei Lin
(74) *Attorney, Agent, or Firm* — Merek, Blackmon & Voorhees, LLC

(57) ABSTRACT

The invention relates to a flame monitor (2, 2', 2", 2''') for monitoring at least one sub-region (18) of a combustion chamber (1) for the presence of a flame (4), comprising: a flame sensor (16) for sensing a physical variable of a flame (4), in particular an intensity of electromagnetic radiation, and for generating an associated electrical sensor signal (26), a dual-channel analyser circuit (28, 28', 28"), connected downstream from the flame sensor (16), for determining whether the sensor signal (26) generated by the flame sensor (16) corresponds to a flame (4) and for outputting a safety-oriented output signal (EXTS1) indicating the presence or absence of a flame (4), wherein the dual-channel analyser circuit (28, 28', 28") comprises: a first channel (28-1) configured to process the sensor signal (26), said channel comprising a first analogue-digital converter (32) in an analogue circuit (30), a first microcontroller (36) belonging to a digital diagnostic comparator unit (34, 34', 34", 34'''), for analysing a first signal obtained from the first analogue-digital converter (32), and a first relay (40) in a relay circuit (42, 42"), which relay (40) is controlled by the first microcontroller (36), and a second channel (28-2) configured to process the sensor signal (26), said channel comprising a second analogue-digital converter (44) in the analogue circuit (30), a second microcontroller (46) belonging to the digital diagnostic comparator unit (34, 34', 34", 34'''), for analysing a second signal obtained from the second analogue-digital converter (44), and a second relay (50) in the (Continued)

relay circuit (42, 42"), which relay (50) is controlled by the second microcontroller (46), wherein the diagnostic comparator unit (34, 34', 34", 34''') is configured to compare a first result of analysis from the first microcontroller (36) and a second result of analysis from the second microcontroller (46) and to influence the output signal (EXTS1), depending on the result of the comparison, characterised in that the diagnostic comparator unit (34, 34', 34", 34''') is configured to compare a signal (D1, D2; FB1, FB2) obtained from one of the two channels (28-1, 28-2) with an associated expected value, with the aid of both the first microcontroller (36) and the second microcontroller (46), and optionally to initiate a fail-operational mode of the analyser circuit (28, 28', 28") depending on the result of the comparison.

22 Claims, 5 Drawing Sheets

(58) Field of Classification Search
USPC ...................................................... 431/78–79
See application file for complete search history.

(56) References Cited

U.S. PATENT DOCUMENTS

| 2015/0159887 | A1  | 6/2015 | Kadah et al. |
| 2020/0208838 | A1* | 7/2020 | Vorlicek ............... F23N 5/24 |

OTHER PUBLICATIONS

Machine generated translation of EP2105669.
Machine generated translation of DE19710206.
Search Report dated Dec. 20, 2021 issued in connection with German Application No. 102021106263.2, nine (9) pages.
Machine generated translation of Search Report dated Dec. 20, 2021 issued in connection with German Application No. 102021106263.2, nine (9) pages.
Extended European Search Report dated Jul. 25, 2022 issued in connection with European Application No. EP 22151357.5, six (6) pages.
Machine generated translation of Extended European Search Report dated Jul. 25, 2022 issued in connection with European Application No. EP 22151357.5, six (6) pages.

\* cited by examiner

FLAME MONITOR

RELATED APPLICATION

The subject patent application claims priority from German Patent Application No. 102021106263.2 filed on Mar. 15, 2021. The entire contents of German Patent Application No. 102021106263.2 are incorporated herein by reference.

The invention relates to a flame monitor for monitoring at least one sub-region of a combustion chamber for the presence of a flame, comprising: a flame sensor for sensing a physical variable of a flame, in particular an intensity of electromagnetic radiation, and for generating an associated electrical sensor signal, a dual-channel analyser circuit, connected downstream from the flame sensor, for determining whether the sensor signal generated by the flame sensor corresponds to a flame and for outputting a safety-oriented output signal indicating the presence or absence of a flame, wherein the dual-channel analyser circuit comprises: a first channel configured to process the sensor signal, said channel comprising a first analogue-digital converter in an analogue circuit, a first microcontroller belonging to a digital diagnostic comparator unit, for analysing a first signal obtained from the first analogue-digital converter, and a first relay in a relay circuit, which relay is controlled by the first microcontroller, and a second channel configured to process sensor signal, said channel comprising a second analogue-digital converter in the analogue circuit, a second microcontroller belonging to the digital diagnostic comparator unit for analysing a second signal obtained from the second analogue-digital converter, and a second relay in the relay circuit, which relay is controlled by the second microcontroller, wherein the diagnostic comparator unit is configured to compare a first result of analysis from the first microcontroller and a second result of analysis from the second microcontroller and to influence the output signal, depending on the result of the comparison.

The invention also relates to a combustion chamber having a flame monitor of the kind initially specified.

The invention relates furthermore to a method for monitoring at least one sub-region of a combustion chamber for the presence of a flame, in particular at least one sub-region of a combustion chamber of the aforementioned kind and/or having a flame monitor of the aforementioned type, comprising the steps of: sensing by means of a flame sensor a physical variable of a flame, in particular an intensity of electromagnetic radiation, and generating an associated electrical sensor signal, determining by means of a dual-channel analyser circuit connected downstream from the flame sensor whether the sensor signal generated by the flame sensor corresponds to a flame, and outputting a safety-oriented output signal indicating the presence or absence of a flame, processing the sensor signal in a first channel of the analyser circuit by means of a first analogue-digital converter in an analogue circuit, a first microcontroller belonging to a digital diagnostic comparator unit for analysing a first signal obtained from the first analogue-digital converter, and by means of a first relay in a relay circuit, which relay is controlled by the first microcontroller, and processing the sensor signal in a second channel of the analyser circuit by means of a second analogue-digital converter in the analogue circuit, a second microcontroller, belonging to the digital diagnostic comparator unit, for analysing a second signal obtained from the second analogue-digital converter, and by means of a second relay in the relay circuit, which relay is controlled by the second microcontroller, comparing a first result of analysis from the first microcontroller and a second result of analysis from the second microcontroller, and influencing the output signal, depending on the result of the comparison.

In the context of the present invention, the expression "outputting a safety-oriented output signal indicating the presence or absence of a flame" is understood to mean that, if the analyser circuit no longer determines, even on only one of the two channels, that the sensor signal generated by the flame sensor corresponds to a flame, the analyser circuit is able to output an output signal indicating the absence of a flame, preferably after a predetermined detection time in the event of a flame failure, for example after approximately 1 s to approximately 5 s.

In the context of the present invention, the expression "influencing the output signal depending on the result of the comparison" is understood to mean that, if the result of comparing the first result of analysis from the first microcontroller with the second result of analysis from the second microcontroller is negative, the output signal may signal a fail stop or a safety shut-down. In the context of the present invention, a "negative result of comparison" is understood to mean that the result of analysis from the first microcontroller differs from the result of analysis from the second microcontroller, preferably even after a tolerance is taken into account. In the context of the present invention, a "fail stop" or a "safety shut-down" is understood to mean that, for safety reasons, due to the aforementioned deviation, due to some other failure established by the analyser circuit or due to some other malfunction in the analyser circuit, the output signal outputs an output signal indicating the non-presence of a flame. Other failures and other malfunctions of the analyser circuit are understood to mean the failures or malfunctions described in the present disclosure.

Flame monitors of the kind initially specified are known from the prior art. For example, the DURAG Group's "D-LX 201" flame monitor is a flame monitor of the kind mentioned above.

The object of the present invention is to improve flame monitors, combustion chambers and/or methods of the aforementioned kind. More particularly, it is an object of the present invention to provide flame monitors, combustion chambers and/or methods of the aforementioned kind which allow increased availability of the combustion chambers and firing plants or process plants equipped therewith, without compromising the safety requirements for such flame monitors, combustion chambers and/or methods.

This object is achieved by the subject-matter of the independent claims.

The invention provides a flame monitor of the kind initially specified, characterised in that the diagnostic comparator unit is configured to compare a signal obtained from one of the two channels with an associated expected value, with the aid of both the first microcontroller and the second microcontroller, and optionally to initiate a fail operational mode of the analyser circuit depending on a result of the comparison. The invention also provides a combustion chamber having such a flame monitor.

The invention also provides a method of the kind mentioned above, characterised by the steps of comparing a signal obtained from one of the two channels with an associated expected value, with the aid of both the first microcontroller and the second microcontroller, and optionally initiating a fail-operational mode of the analyser circuit depending on the result of the comparison.

In the context of the present invention, the expression "fail-operational mode" is understood to mean that, despite a negative result of comparing the first result of analysis from the first microcontroller with the second result of analysis from the second microcontroller, the analyser circuit is able to not necessarily trigger a fail stop signal or a safety shut-down signal as an output signal of the analyser circuit, but to continue indicating the presence of a flame by means of the output signal, preferably for at least a pre-defined period.

In the context of the present invention, the expression "optionally initiating" a fail-operational mode is understood to mean that, if a fault occurs in the respective channel, the analyser circuit does not output the output signal invariably, or at least not immediately, in such a way that it indicates the non-presence of a flame. Although, by optionally initiating the fail-operational mode, the analyser circuit still has the option of triggering a fail stop in certain circumstances as described in the present disclosure, according to the invention it also has the option, on the other hand, of allowing continued operation in a fail-operational mode of at least a sub-region of a combustion chamber monitored by the flame monitor, preferably for a limited period of time, or also of the entire combustion chamber, in particular under the conditions mentioned in the present invention, for example by using the other of the two channels. During the fail-operational mode, the flame monitor thus continues to generate an output signal indicating the presence of a flame.

One advantage of the invention, inter alia, is that by comparing a signal obtained from one of the two channels with an associated expected value, it is possible to establish, for example, that said channel is faulty if the comparison shows that the signal obtained does not match the expected value. According to the invention, the comparison is carried out simultaneously with the aid of both the first microcontroller and the second microcontroller. This advantageously rules out the possibility that the fault detected in that channel is in one of the microcontrollers of the diagnostic comparator unit. The invention can thus determine that the fault is in an analogue section or in analogue parts of that channel. The invention preferably also takes into account that a part of the analogue-digital converter in the respective channel is analogue, but also has a digital part, i.e. it includes digital processing as well as the forwarding of digital signals, errors in which are preferably also taken into account by the diagnostic comparator unit and by the two microcontrollers, i.e. they preferably belong likewise to the region of continued single-channel operation. By this means, the invention provides the option of initiating a fail-operational mode of the analyser circuit without compromising the safety requirements of the flame monitor. This is because, thanks to the invention, the analyser circuit can detect in this case that there is at least a possibility that only the channel under investigation has a fault, but that the flame is still present.

This fail-operational mode is very advantageous, because the present invention realised that the flame monitors initially mentioned are used almost exclusively in combustion chambers of industrial-scale systems. These are complex firing systems, for example, or firing processes in continuous operation with many possible fuels, such as gas, oil, lignite or anthracite coal. However, they can also be blast furnaces in the steel industry, chemical plants, waste incineration plants or cement production plants. The invention has now realised that what all these industrial-scale combustion processes have in common, on the one hand, is that it is highly important for safety reasons that if the analyser circuit on one of the two channels determines that the sensor signal generated by the flame sensor no longer corresponds to a flame, the analyser circuit generates and outputs an output signal indicating the absence of a flame, for example so that a valve supplying fuel to the combustion chamber can be closed. This prevents the continued flow of fuel, for example gas, into the combustion chamber, even though the flame in the combustion chamber may have gone out.

At the same time, however, the invention realised that what all these industrial-scale combustion processes also have in common is that shutting down and, in particular, starting up such systems involves enormous costs. A major advantage of the invention is therefore that the optional fail-operational mode allows continued operation of the combustion chamber. This increases the availability of such systems. During this continued operation of the combustion chamber, it can be advantageously established, for example, whether the other channel indicates the presence of a flame. If this is the case, operation can be continued in the fail-operational mode, for example until the faulty channel has been repaired. In other words, if a fault-free channel detects the presence of a flame ("flame on"), then this can still be signalled to the outside, and the fuel supply maintained, despite a fault in the redundant channel. It is possible, as a basic principle, to switch over to a fail-operational mode even in a "flame out" state. It is not imperative that the flame monitor be in a "flame on" state for the system to be switched to a fail-operational mode. This means that a combustion chamber operator is then advantageously able to start the burner and to feed fuel to it, despite a fault in the flame monitor. The invention relates to a flame monitor and to a method for monitoring at least one sub-region of a combustion chamber for the presence of a flame. This thus includes any portions or sub-regions of the combustion chamber, but also the entire combustion chamber, i.e. whether a flame is present somewhere in the combustion chamber.

Thus, the invention also advantageously includes various safety analyses: in one case, for example, it is checked that a flame is present in a specific sub-region of the combustion chamber, for example in a sub-region of the combustion chamber associated with a particular burner of the combustion chamber, i.e. an individual burner is monitored. In another case, it is preferably checked, for example, whether there is any flame at all anywhere in the combustion chamber. Combustion chamber monitoring is thus performed on the entire combustion chamber. To that end, the flame sensor can preferably look into the combustion chamber with a cone of vision or field of vision with a particular angle of aperture. The flame sensor can preferably be configured, and its sensitivity provided and adjusted, in such a way that an associated electrical sensor signal is generated that corresponds to an electromagnetic radiation prevailing in the sub-region of the combustion chamber provided for the flame. This sub-region can preferably be a sub-region associated with a particular burner of the combustion chamber. However, the flame sensor can preferably also be configured, and its sensitivity provided and adjusted, in such a way that an associated electrical sensor signal is generated when a flame is detected somewhere in the combustion chamber on the basis of corresponding electromagnetic radiation, i.e. the combustion chamber is monitored as a whole.

In one embodiment of the invention, the comparison of a signal obtained from one of the two channels with an associated expected value is triggered by the result of comparing the first and second results of analysis from the first and second microcontrollers, respectively, in respect of the first signal obtained from the first analogue-digital converter and the second signal obtained from the second analogue-digital converter. In this embodiment, in other words, the comparison of a signal obtained from one of the two channels with the associated expected value is carried out with the aid of both microcontrollers, for example it is not carried out until the result of comparing the results of analysis of the signals obtained from the two analogue-digital converters indicates a difference, preferably above a tolerance limit, between these two signals.

The fact that such a difference exists is an indication of a fault in one of the two channels. In this embodiment, therefore, the comparison of a signal obtained from one of the two channels with an expected value, according to the invention, is not performed until such a fault indication is present. This saves processing capacity, in particular, in the electronic processing components involved, because in this embodiment the comparison according to the invention of a signal obtained from one of the two channels with an associated expected value is not performed continuously.

In both the case where the comparison according to the invention of a signal obtained from one of the two channels with an associated expected value is performed independently of a result of analysis of the sensor signals, and also in the above case of the embodiment in which this comparison is only triggered by the result of comparing the results of analysis, the invention benefits from the fact that, according to the invention, the comparison is carried out with the aid of both the first microcontroller and the second microcontroller, so that a fault in one of the microcontrollers of the diagnostic comparator unit is advantageously ruled out before the fail-operational mode is initiated.

It is advantageously possible, therefore, to continue operating at least one sub-region of the combustion chamber monitored by the flame monitor according to the invention, or indeed the entire combustion chamber, preferably at least within a predefined period of approximately 24 hours, for example, with a fail-operational mode of the flame monitor, for example by using the other of the two channels to analysis the sensor signal from the flame sensor. If this other channel indicates the presence of a flame, the monitored combustion chamber could continue to be operated, preferably for the predefined period, until the faulty channel has been repaired or reset, for example. However, if the other channel does not indicate the presence of a flame, then the analyser circuit would output an output signal indicating the absence of a flame, with the aid of which a valve, for example, can then be closed and the fuel supply to the monitored combustion chamber stopped, so the level of safety provided by the flame monitor according to the invention is not compromised by the option of initiating the fail-operational mode according to the invention. It is also advantageous, however, that the fail-operational mode can be activated if, in the "flame out" state, a fault is detected in one of the two channels. This means that a combustion chamber operator is then advantageously able to start the burner and to feed fuel to it, despite a fault in the flame monitor.

A preferred embodiment of the invention is characterised in that the diagnostic comparator unit is so configured that the fail-operational mode is initiated only if the result of comparison obtained with the aid of both the first microcontroller and the second microcontroller is that the signal compared with the expected value differs from said expected value, preferably after a tolerance has been taken into account. This advantageously ensures that the fail-operational mode is not initiated if, for example, it is with the aid of only one of the two microcontrollers that the result of the comparison is that the signal compared with the expected value differs from the expected value. This is because, in such a case, there is a fault in one of the two microcontrollers of the diagnostic comparator unit. There should be no continued operation in such a case.

Instead, for safety reasons, the flame monitor should preferably only be operated in a fail-operational mode if the diagnostic comparator unit is fault-free. This is confirmed, for example, when the result of comparison obtained with the aid of both the first microcontroller and the second microcontroller, preferably after taking into account a tolerance of about 3 s, for example, is that the signal compared with the expected value differs from the expected value. In such a case, it is advantageously established at the same time that there is a fault in this one of the two channels outside the diagnostic comparator unit. If it is then established, for example with a second measurement carried out with the other one of the two channels, that both of the results of comparison obtained there match the expected value, then this embodiment offers the option of assigning a fault unambiguously to one of the two channels and simultaneously ruling out that the fault is in the diagnostic comparator unit itself.

Another embodiment of the present invention is characterised in that the diagnostic comparator unit is so configured that the fail-operational mode is not initiated, but, preferably after a predefined failure tolerance time, the analyser circuit triggers a fail stop if the result of comparison, either with the aid of the first microcontroller only or with the aid of the second microcontroller only, is that the signal compared with the expected value differs from said expected value, preferably after a tolerance has been taken into account. In this case, one of the two microcontrollers of the diagnostic comparator unit and thus the diagnostic comparator unit itself has a fault and is therefore no longer fault-free. This embodiment thus provides the advantage of indicating a fail stop independently of a result obtained by comparing the analyses of the two sensor signals, because if there is a fault in the diagnostic comparator unit, it is no longer possible to analyse properly the sensor signals from the flame sensor.

To put it more precisely, a fail stop can be advantageously triggered with this embodiment, regardless of whether the comparison of the first result of analysis from the first microcontroller in respect of the first signal obtained from the first analogue-digital converter and the second result of analysis from the second microcontroller in respect of the second signal obtained from the second analogue-digital converter indicates differences in said first and second signals and thus, as the case may be, that the flame is no longer present. In other words, this embodiment of the invention provides a further increase in the safety of the flame monitor according to the invention, as it allows continuous monitoring of the diagnostic comparator unit and corresponding triggering of a fail stop by the analyser circuit or the flame monitor according to the invention, and thus the shutoff of the fuel supply. As part of the safety-related control of the actuator by the analyser circuit, this embodiment of the invention thus provides not only the possibility of shutting off the fuel supply when there are different results of analysis from the first and second microcontrollers, but also and additionally the possibility of shutting off the fuel supply when there is a fault in the diagnostic comparator unit.

One embodiment of the invention is characterised in that the signal obtained from one of the two channels is a signal obtained from the analogue-digital converter in that channel. This embodiment advantageously allows easy detection of errors in the one signal read by both microcontrollers, for example by detecting a signal overload or by detecting harmonic signals in the signal obtained from the analogue-digital converter, or by detecting that no valid values are obtained from the analogue-digital converter. The latter is the case, for example, when a data backup indicates a failure in digital communication between the analogue-digital converter and one or both of the microcontrollers.

In one embodiment of the invention, a first analogue changeover switch arranged upstream in the analogue circuit of the first analogue-digital converter in the first channel and switchable by the diagnostic comparator unit, and a second analogue changeover switch arranged upstream in the analogue circuit of the second analogue-digital converter in the second channel and switchable by the diagnostic comparator unit are provided, wherein the diagnostic comparator unit is configured to supply the analogue-digital converter, by switching the first and/or the second analogue changeover switch, preferably for a limited, predefined test period, with a test signal preferably having a predefined amplitude and/or a predefined frequency, instead of the sensor signal, for testing said analogue-digital converter.

In this embodiment, the diagnosis of one of the two channels is advantageously carried out with the aid of a separate test signal. This test signal is preferably generated by at least one test signal generator in at least one of the two microcontrollers. In this embodiment of the invention, to that end, the sensor signal originating from the flame sensor, which may be pre-processed by a suitable amplifier, is not fed directly to the analogue-digital converter in the respective channel, but via an analogue changeover switch provided in the respective channel. According to the invention, it is possible in this way to provide the test signal instead of the sensor signal to the respective analogue-digital converter, by switching the first and/or the second analogue changeover switch, preferably for a limited, predefined test period of about 100 ms to about 1000 ms, for example. With the aid of this test signal, the respective analogue-digital converter is tested or diagnosed in accordance with the invention, because the digital signal converted from the test signal by the respective analogue-digital converter is fed according to the invention to both of the microcontrollers of the diagnostic comparator unit, so that the comparison according to the invention of this signal with an associated expected value can be carried out. According to the invention, therefore, it can either be established that the channel, in particular the tested analogue-digital converter, is fault-free, since the signal obtained from the analogue-digital converter matches the associated expected value, or a fail-operational mode can be initiated by the analyser circuit if the signal obtained does not match the associated expected value, with the aid of both the first microcontroller and the second microcontroller, even after deduction of a suitable tolerance.

In this embodiment, the associated expected value can be a specific test pattern, for example. The expected value or the test pattern is preferably exchanged between the two microcontrollers via an internal data exchange, so that both microcontrollers have identical expected values or identical test patterns.

There is preferably only a single test signal generator or only a single source for the test signal. The safety level of the flame monitor according to the invention is thus extended advantageously to the test signal generator as well. If an error occurs when generating the test signal, not only does the test of one of the two analogue-digital converters fail, but due to the error during test signal generation a deviation from the expected value also occurs during a subsequent test of the other channel, with the result that a fail stop is preferably triggered then, at the latest, by the analyser circuit or the flame monitor. This is advantageous because generation of the test signal, and the test signal generator itself, is also part of the diagnostic comparator unit, which should be fault-free in order to maintain the safety level preferably aimed at here.

The test signal of this embodiment is fed to the respective analogue changeover switch. The respective analogue changeover switch is used to disconnect or toggle the respective sensor signal. Before a test sequence starts, the respective sensor signal is preferably disconnected by the respective analogue changeover switch in that channel, and instead the test signal is fed to the respective analogue-digital converter via the respective analogue changeover switch.

The embodiments of the invention described above that use a test signal provide the advantage, in particular, that a test, in particular of the analogue-digital converter in a particular channel, can be carried out independently of a sensor signal in the respective channel.

One embodiment of the invention is characterised in that the first analogue changeover switch is switchable by the first microcontroller via a first control line, the second analogue changeover switch is switchable by the second microcontroller via a second control line, a status of the first control line is monitorable by the second microcontroller via a first readback line to the second microcontroller by comparing said status with a first expected status of the control line, a status of the second control line is monitorable by the first microcontroller via a second readback line to the first microcontroller by comparing said status with a second expected status of the control line, and wherein, preferably after a predefined readback failure tolerance time of, for example, about 1 ms to about 100 ms, a fail stop of the analyser circuit is triggered if the status of the first control line differs from the first expected status of the control line, preferably after taking a tolerance into account, and/or the status of the second control line differs from the second expected status of the control line, preferably after taking a tolerance into account. This embodiment provides the advantage, in particular, that the respective control line provided for an analogue changeover switch in one of the channels can be monitored via an associated readback line with the aid of the microcontroller of the other channel. This advantageously precludes the respective analogue changeover switch being wrongly actuated and causing an error.

A preferred embodiment of the invention is characterised in that a first additional analogue changeover switch controllable by the diagnostic comparator unit is provided in the first channel for disconnecting the test signal in the first channel, and a second additional analogue changeover switch controllable by the diagnostic comparator unit is provided in the second channel for disconnecting the test signal in the second channel. The advantages of this embodiment are that, by providing an additional analogue changeover switch associated with the respective analogue changeover switch, dual failure safety is provided. This is because an initial fault could remain undetected, with the result than some other fault could occur within 24 hours. As a consequence of such a situation, the test signal described above, for example, could simulate a flame, which would constitute a dangerous fault, i.e. a fault that compromises the safety level of the flame monitor according to the invention.

A preferred embodiment of the invention is characterised in that the diagnostic comparator unit is configured to check, before connection of the sensor signal after disconnection of the test signal in a selected channel, by means of both microcontrollers, whether the test signal has been disconnected in the selected channel and whether the respective additional analogue changeover switch for disconnecting the test signal is working in the selected channel. This embodiment offers the additional security that, for example, a test signal for checking a particular signal cannot reach the respective analogue-digital converter outside an appropriate test phase or outside an appropriate test period and therefore simulate a flame erroneously.

A preferred embodiment of the invention is characterised in that the signal obtained from one of the two channels is a signal obtained from the relay in said channel. By this means, the relay circuit of the flame monitor according to the invention, or a particular relay, can also be checked or diagnosed advantageously. It is preferred in this regard that the signal obtained by the relay is a signal obtained from a readback contact of the relay. In this way, a signal to be compared with an associated expected value by means of the two microcontrollers can be obtained according to the invention in a particularly simple manner.

This is because, due to the readback contact, it can easily be checked with the aid of the two microcontrollers whether the load contact of the respective relay, which reports the safety-relevant flame signal of the flame monitor to the outside via the output signal, is switching correctly.

A preferred embodiment of the invention is characterised in that the first relay is controllable by the first microcontroller via a first relay control line, the second relay, which is preferably connected in series to the first relay, is controllable by the second microcontroller via a second relay control line, a status of the first relay control line is monitorable by the second microcontroller via a first relay readback line to the second microcontroller by comparing said status with a first expected status of the relay control line, a status of the second relay control line is monitorable by the first microcontroller via a second relay readback line to the first microcontroller by comparing it with a second expected status of the relay control line, and wherein, preferably after a predefined readback failure tolerance time of, for example, about 3 s, a fail stop of the analyser circuit is triggered if the status of the first relay control line differs from the first expected status of the relay control line, preferably aftertaking a tolerance into account, and/or the status of the second relay control line differs from the second expected status of the relay control line, preferably after taking a tolerance into account.

The advantage of this embodiment, in particular, is that it allows faults in a relay channel to be additionally distinguished from faults in the diagnostic comparator unit or in one of the microcontrollers. This is because, in this embodiment, the respective other microcontroller of the diagnostic comparator unit reads back the respective relay control line of the respective flame relay via an associated relay readback line. If the status of the respective relay control line read back in this way differs from an associated expected status of the relay control line, it is preferably assumed that there is a fault in the diagnostic comparator unit, with the consequence that a fail stop can be triggered by the analyser circuit, preferably within a short failure tolerance time.

On the other hand, if no difference from the expected statuses of the respective relay control lines is detected in the relay control lines, a fail-operational mode can be initiated if the result of comparing a signal obtained from one of the two channels with an associated expected value by means of both the first and second microcontrollers indicates a difference. Activation of the respective relay remains advantageously unchanged. In the event of a permanently closed load contact of the respective relay, the flame monitor can still send a correct flame presence signal or flame absence signal to the outside by means of the output signal via a respective safety-relevant relay output of the flame monitor. On the other hand, it is advantageous that, in the event of a defect in the respective readback contact, the respective relay continues to switch correctly on the load side, with the result that the correct flame presence signal can continue to be signalled to the outside by the output signal via the corresponding safety-relevant output of the flame monitor.

In this embodiment, two positively driven relays are used in series, so that if one of the relays fails or is incorrectly switched, the other relay is still available to maintain the desired redundancy.

A preferred embodiment of the invention has a first amplifier arranged in the analogue circuit for conditioning the sensor signal in the first channel for the first analogue-digital converter, and a second amplifier arranged in the analogue circuit for conditioning the sensor signal in the second channel for the second analogue-digital converter, wherein the signal obtained from one of the two channels is a signal obtained from the amplifier in said channel. In this way, diagnosing a channel in accordance with the invention by comparing a signal obtained from said channel with an associated expected value with the aid of both microcontrollers can be easily done with a signal obtained from the respective amplifier in said channel. A fault in the respective channel can preferably be detected by detecting signal overloads or harmonic signals.

One embodiment of the invention is characterised in that the first amplifier is controllable by the first microcontroller via a first drive line, the second amplifier is controllable by the second microcontroller via a second drive line, a status of the first control line is monitorable by the second microcontroller via a first amplifier readback line to the second microcontroller by comparing said status with a first expected status of the drive line, a status of the second control line is monitorable the first microcontroller via a second amplifier readback line to the first microcontroller by comparing said status with a second expected status of the drive line, and wherein, preferably after a predefined readback failure tolerance time, for example of about 3 s, a fail stop of the analyser circuit is triggered if the status of the first drive line differs from the first expected status of the drive line, preferably after taking a tolerance into account, and/or the status of the second control line differs from the second expected status of the drive line, preferably after taking a tolerance into account. One advantage of this embodiment, in particular, is that the respective drive line provided for an amplifier in one of the channels can be monitored via an associated amplifier readback line with the aid of the microcontroller of the other channel. This advantageously precludes the respective amplifier from being incorrectly controlled and causing an error.

Another embodiment of the invention is characterised in that the diagnostic comparator unit is so configured that the comparison of a signal obtained from one of the two channels with an associated expected value can be carried out alternately with a signal obtained from the first channel and with a signal obtained from the second channel.

In this context, the term "alternating" means that the two channels are successively diagnosed or checked in accordance with the invention by comparing a signal obtained from one of the two channels with an associated expected value with the aid of both microcontrollers. The advantage of this embodiment is that, while a channel is being diagnosed in accordance with the invention by the two microcontrollers comparing the signal obtained from said channel with an associated expected value, the other of the two channels can continue to analyse the redundant sensor signal using the respective microcontroller of that channel, preferably also with the aid of both microcontrollers, thus ensuring overall that measurement by the flame monitor according to the invention is uninterrupted. In other words, according to the invention, uninterrupted measurement is also possible during the diagnosis according to the invention, in that only one of the two microcontrollers computes the flame decision, i.e. the presence or absence of a flame in the monitored sub-region of the combustion chamber or anywhere in the combustion chamber, and then communicates only the result to the other microcontroller. According to the invention, however, uninterrupted measurement during the diagnosis is also possible, in that the digital signal of the A/D converter is fed in each case to both of the microcontrollers of the diagnostic comparator unit, whereby the signal that is not being tested during the diagnosis is used by both microcontrollers for the flame decision. Thus, in the case of the latter variant, both microcontrollers advantageously continue to compute the flame decision independently of each other, also during diagnosis.

A preferred embodiment of the invention is characterised in that the diagnostic comparator unit is configured to maintain the fail-operational mode for a predefined period. This period is based advantageously on the probability of a second fault, in other words, the probability of a second fault should be as low as possible within the predefined period.

In a preferred embodiment of the invention, the fail-operational mode includes the analyser circuit or the flame monitor operating only with the other of the two channels, i.e. it operates in single-channel mode only. In this embodiment, the channel detected as having a fault preferably continues to be tested or diagnosed in accordance with the invention. The flame monitor operates in this regard in a single-channel mode of diagnostic operation. In this operating mode, the flame monitor does not simply continue to operate in fail-operational mode with the unchecked channel, but the check is continuously or repeatedly performed, preferably within a predefined diagnosis time. It is not until the check has been repeated a certain number of times or an individually predefined diagnosis time has elapsed that a decision is made as to whether operation is to continue in the fail-operational mode, finally, i.e. without further testing of the channel identified as having a fault, or whether the analyser circuit is to switch back to normal dual-channel operation if, for example, repeated testing of the channel originally identified as having a fault has shown that this channel originally identified as having a fault does not have a fault after all. This embodiment thus provides increased flexibility in the event that the signal obtained from one of the two channels is found by the two microcontrollers to differ from the associated expected value and in particular when setting a time period, or when continuing or terminating a fail-operational mode initiated in response.

A preferred embodiment of the invention is characterised by the fact that the analyser circuit operates only in single-channel mode with the other of the two channels only if the diagnostic comparator unit has classified said other of the two channels as fault-free. This ensures that, in fail-operational mode, there is no changeover to a faulty channel, or continued operation using a faulty channel.

A preferred embodiment of the invention is characterised in that the diagnostic comparator unit is configured for multiple comparisons of a signal obtained from one of the two channels with an associated expected value, with the aid of both the first microcontroller and the second microcontroller, preferably within a predetermined failure tolerance time of, for example, approximately 1 s to approximately 10 s, before a result of the comparisons is specified. The multiple comparisons according to this embodiment increase the reliability of the result obtained from the comparisons.

A preferred embodiment of the invention is characterised in that the diagnostic comparator unit is so configured that, if it is determined in one of the two channels that the sensor signal generated by the flame sensor does not correspond to a flame, it performs the comparison with an associated expected value, preferably exclusively, with a signal obtained from said channel. In this embodiment, the comparison of a signal obtained from one of the two channels with an associated expected value by means of the two microcontrollers, in accordance with the invention, is advantageously triggered by the sensor signal generated by the flame sensor not comparing a flame, i.e. if it is established for one of the two channels, when the results of analysis from the two microcontrollers are compared, that the result of analysis produced by the respective microcontroller states that the sensor signal in that channel from the flame sensor does not correspond to a flame. This embodiment thus provides the advantage that the channel indicating that there is no longer a flame, and which would therefore cause an output signal indicating the absence of a flame to be outputted, is diagnosed in accordance with the invention. A predefined failure tolerance time can thus be fully utilised, which means that the maximum possible number of times that the comparison of a signal obtained from one of the channels with an associated expected value, with the aid of both microcontrollers, can be repeated within a predefined failure tolerance time can be increased, thus increasing the safety level, without this diagnosis time causing flame absence signalling, since the sensor signal of the channel reporting "flame on" is used during the diagnosis as the basis for the flame decision made by both microcontrollers.

In the preferred embodiment of the invention, a separate power supply is provided for each of the two channels, at least for their analogue parts. This advantageously ensures that the channels are independent of each other.

The invention claims independent protection for a combustion chamber having a flame monitor according to any one of the above embodiments.

Although the effects and advantages of the embodiments of the invention described above have been described in connection with the inventive flame monitor for monitoring at least a sub-region of a combustion chamber for the presence of a flame, it should be understood at this point, however, that the effects and advantages described above also apply in equal measure to the embodiments of the inventive method, described below, for monitoring at least a sub-region of a combustion chamber for the presence of a flame. To avoid repetition, these effects and advantages will not be described in detail again. Preferred embodiments of the method according to the invention comprise the following steps in particular:

A preferred embodiment of the method according to the invention is characterised in that the fail-operational mode is initiated only if the result of comparison obtained with the aid of both the first microcontroller and the second microcontroller is that the signal compared with the expected value differs from said expected value, preferably after a tolerance has been taken into account.

An embodiment of the method according to the invention is characterised in that the fail-operational mode is not initiated, but, preferably after a predefined failure tolerance time of about 3 s, for example, the analyser circuit triggers a fail stop if the result of comparison, either with the aid of the first microcontroller only or with the aid of the second microcontroller only, is that the signal compared with the expected value differs from said expected value, preferably after a tolerance has been taken into account.

An embodiment of the method according to the invention is characterised in that the signal obtained from one of the two channels is a signal obtained from the analogue-digital converter in said channel.

An embodiment of the method according to the invention comprises a first analogue changeover switch arranged upstream in the analogue circuit from the first analogue-digital converter in the first channel and switchable by the diagnostic comparator unit, and a second analogue changeover switch arranged upstream in the analogue circuit from the second analogue-digital converter in the second channel and switchable by the diagnostic comparator unit, wherein, instead of the sensor signal, and by switching the first and/or the second analogue changeover switch, a test signal preferably having a predefined amplitude and/or a predefined frequency is fed to the respective analogue-digital converter, preferably for a limited predefined test period, for testing said analogue-digital converter.

An embodiment of the method according to the invention is characterised in that the first analogue changeover switch is switchable by the first microcontroller via a first control line, the second analogue changeover switch is switchable by the second microcontroller via a second control line, a status of the first control line is monitorable by the second microcontroller via a first readback line to the second microcontroller by comparison with a first expected status of the control line, a status of the second control line is monitorable by the second microcontroller via a second readback line to the first microcontroller by comparison with a second expected status of the control line, and comprises the step of: triggering, preferably after a predefined readback failure tolerance time, a fail stop of the analyser circuit if the status of the first control line differs from the first expected status of the control line, preferably after taking a tolerance into account, and/or the status of the second control line differs from the second expected status of the control line, preferably after taking a tolerance into account.

An embodiment of the method according to the invention is characterised by disconnecting the test signal in the first channel, after a predefined test period has elapsed, by means of a first additional analogue changeover switch arranged in the first channel and controllable by the diagnostic comparator unit, and/or by disconnecting the test signal in the second channel, after a predefined test period has elapsed, by means of a second additional analogue changeover switch arranged in the second channel and controllable by the diagnostic comparator unit.

An embodiment of the method according to the invention is characterised by checking, before connection of the sensor signal after disconnection of the test signal in a selected channel, by means of both the microcontrollers in the selected channel, whether the test signal has been disconnected and whether the respective additional analogue changeover switch for disconnecting the test signal is working in the selected channel.

An embodiment of the method according to the invention is characterised in that the signal obtained from one of the two channels is a signal obtained from the relay in said channel.

An embodiment of the method according to the invention is characterised in that the signal obtained from the relay is a signal obtained from a readback contact of the relay.

A preferred embodiment of the method according to the invention is characterised in that the first relay is controllable by the first microcontroller via a first relay control line, the second relay, which is preferably connected in series to the first relay, is controllable by the second microcontroller via a second relay control line, a status of the first relay control line is monitorable by the second microcontroller via a first relay readback line to the second microcontroller, by comparing said status with a first expected status of the relay control line, the method comprising the steps of: monitoring a status of the second relay control line via a second relay readback line to the first microcontroller by comparing it with a second expected status of the relay control line, and triggering, preferably after a predefined readback failure tolerance time, a fail stop of the analyser circuit if the status of the first relay control line differs from the first expected status of the relay control line, preferably after taking a tolerance into account, and/or the status of the second relay control line differs from the second expected status of the relay control line, preferably after taking a tolerance into account.

An embodiment of the method according to the invention comprises the steps of conditioning the sensor signal in the first channel for the first analogue-digital converter by means of a first amplifier arranged in the analogue circuit, and conditioning the sensor signal in the second channel for the second analogue-digital converter by means of a second amplifier arranged in the analogue circuit, wherein the signal obtained from one of the two channels is a signal obtained from the amplifier in said channel.

An embodiment of the method according to the invention is characterised in that the first amplifier can be activated by the first microcontroller via a first activation line and the second amplifier can be activated by the second microcontroller via a second activation line, said method comprising the steps of: the second microcontroller monitoring a condition of the first activation line via a first amplifier readback line to the second microcontroller by comparing said condition with a first expected condition of the activation line, the first microcontroller monitoring a condition of the second activation line via a second amplifier readback line to the first microcontroller by comparing said condition with a second expected condition of the activation line, and triggering a fail stop of the analyser circuit, preferably after a predefined readback failure tolerance time, if the condition of the first activation line differs from the first expected condition of the activation line, preferably after taking a tolerance into account, and/or the condition of the second activation line differs from the second expected condition of the activation line, preferably after taking a tolerance into account.

An embodiment of the method according to the invention is characterised by the comparison of a signal obtained from one of the two channels with an associated expected value being carried out alternately with a signal obtained from the first channel and with a signal obtained from the second channel.

An embodiment of the method according to the invention is characterised by maintaining the fail-operational mode for a predefined period.

An embodiment of the method according to the invention is characterised in that the fail-operational mode includes the analyser circuit operating only in single-channel mode with the other of the two channels.

An embodiment of the method according to the invention is characterised in that the analyser circuit operates only in single-channel mode with the other of the two channels only if the diagnostic comparator unit has classified that other of the two channels as fault-free.

An embodiment of the method according to the invention is characterised by multiple comparisons of a signal obtained from one of the two channels with an associated expected value, not only with the aid of the first microcontroller but also with the aid of the second microcontroller, before a result of the comparisons is specified, preferably not until a predetermined failure tolerance time has elapsed.

An embodiment of the method according to the invention is characterised in that the comparison with an associated expected value is performed, preferably exclusively, with a signal which is obtained from a channel in which it has been determined that the sensor signal generated by the flame sensor does not correspond to a flame.

Other advantageous embodiments of the invention are specified in the dependent claims.

Embodiments of the invention shall now be described with reference to the drawings, in which identical or functionally identical parts are marked with the same reference signs, and in which.

Figure 1:
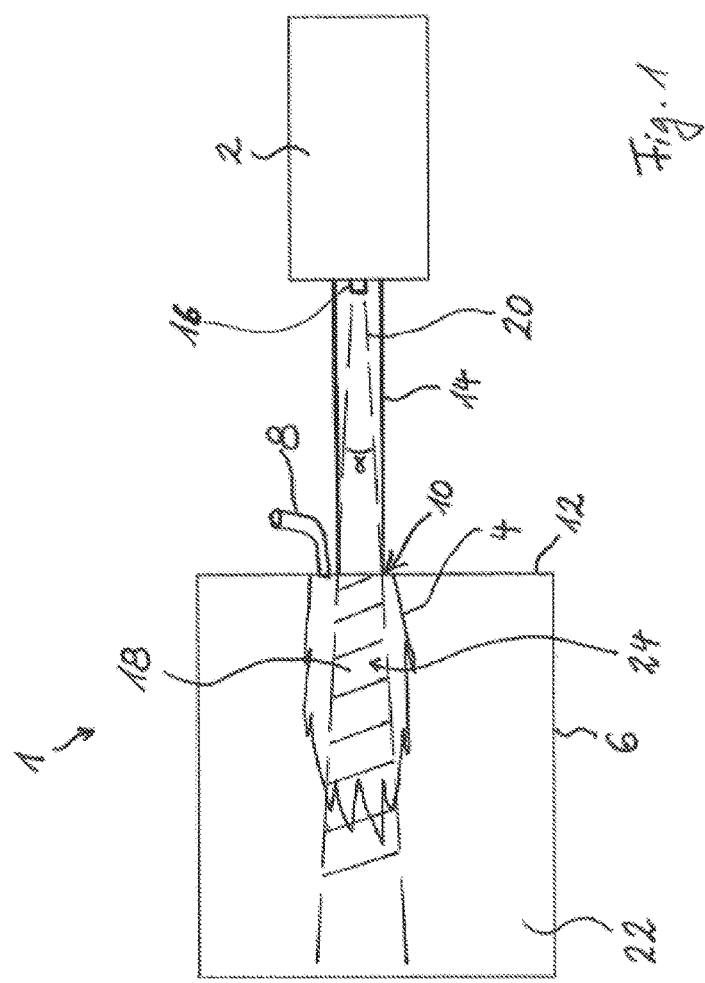
FIG. 1 shows a schematic structure of an embodiment of a combustion chamber having a flame monitor.

FIG. 1 shows a schematic structure of an embodiment of a combustion chamber 1 having a flame monitor 2 for monitoring the presence of a flame 4 in combustion chamber 1. Flame 4 is in a housing 6 of the combustion chamber 1 on a burner, not shown, which is supplied with fuel for feeding flame 4 via a fuel feed line 8 which is connected to a supply of fuel, not shown, and which also feeds air.

A sighting tube 14 which is connected to flame monitor 2 is located on an aperture 10 in side wall 12 shown on the right of combustion chamber 1, facing flame monitor 2. Sighting tube 14 is optional, so flame monitor 2 can also be connected directly to housing 6.

In the embodiment shown in FIG. 1, flame monitor 2 supports, on a section facing into the sighting tube, a flame sensor 16 for sensing a physical variable of a flame 4, in particular for sensing electromagnetic radiation, in a sub-region 18 provided for flame 4 and shown as a hatched area in FIG. 1. Flame sensor 16 can look through opening 10, with a cone of vision or field of vision 20 with an angle of aperture a of 6°, for example, into an interior 22 of combustion chamber 1 surrounded by housing 6. Flame sensor 16 is also configured, in particular in respect of its sensitivity, in such a way that it generates an associated electrical sensor signal 26 (see FIG. 2) that corresponds to an electromagnetic radiation 24 prevailing in the sub-region 18 provided for flame 4. In the embodiment shown in FIG. 1, flame sensor 16 has a spectral sensitivity for sensing electromagnetic radiation in wavelength ranges from about 280 to about 410 nanometres, for example, and/or from about 190 to about 520 nanometres and/or from about 780 to about 1800 nanometres.

Figure 2:
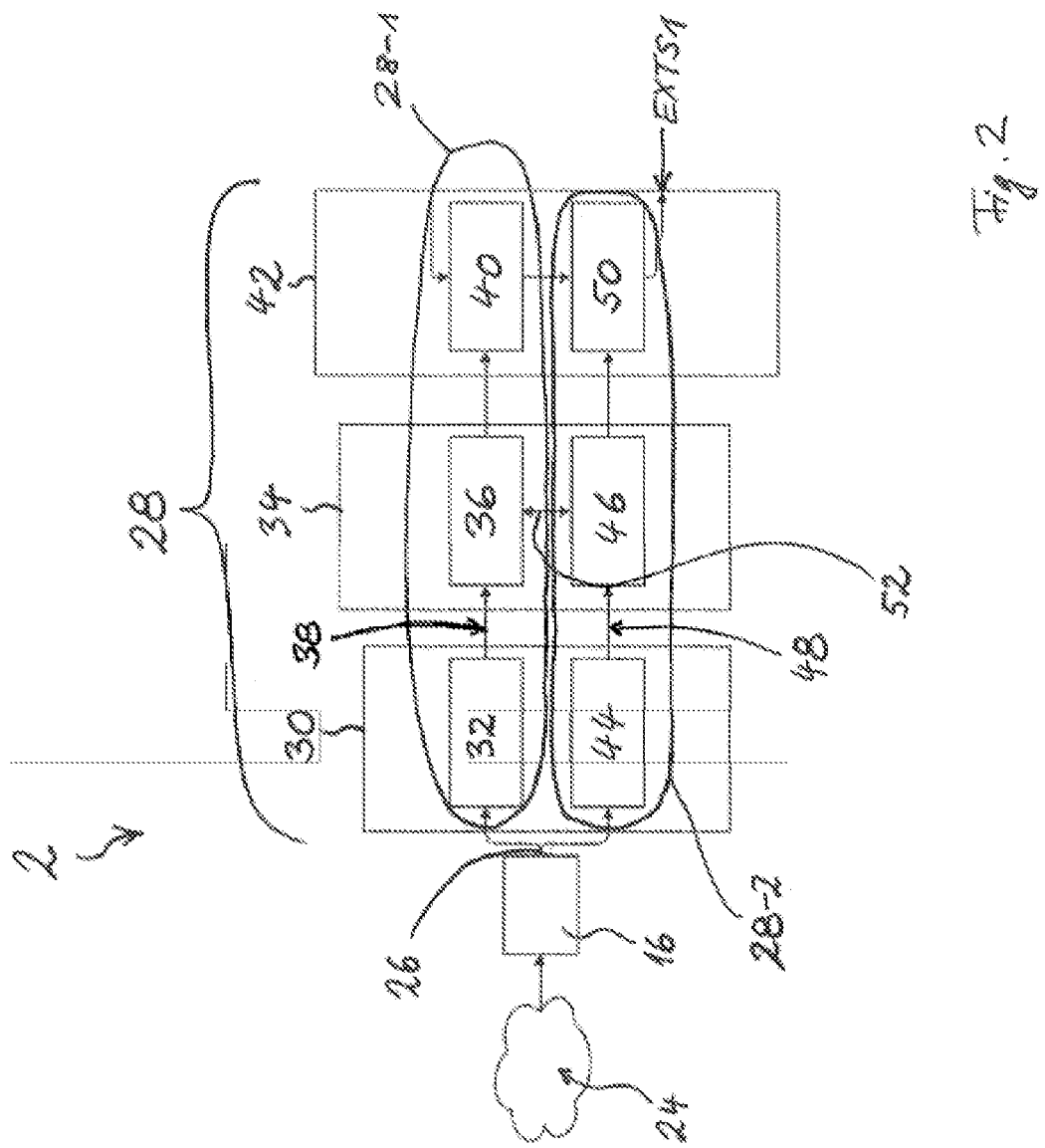
FIG. 2 shows a schematic structure of a first embodiment of a flame monitor.

FIG. 2 shows a schematic structure of a first embodiment of a flame monitor, for example, of a flame monitor 2 according to FIG. 1. According to this embodiment, flame monitor 2 for monitoring the presence of a flame 4 in a combustion chamber, for example in a combustion chamber 1 according to FIG. 1, has a flame sensor 16 for sensing a physical variable of a flame, for example in a sub-region 18 according to FIG. 1, and for generating an associated electrical sensor signal 26.

The flame monitor 2 shown in FIG. 2 further comprises a dual-channel analyser circuit 28, connected downstream from flame sensor 16, for determining whether the sensor signal 26 generated by flame sensor 16 corresponds to a flame 4, and for outputting a safety-oriented output signal EXTS1 indicating the presence or absence of a flame 4.

Dual-channel analyser circuit 28 has a first channel 28-1 configured to process sensor signal 26 and a second channel 28-2 configured to process sensor signal 26. In an analogue circuit 30, the first channel 28-1 comprises a first analogue-digital converter 32, which has a first analogue amplifier and which is referred to hereinafter as first A/D converter 32. The first channel 28-1 further comprises a first microcontroller 36 belonging to a digital diagnostic comparator unit 34, for analysing a first signal 38 obtained from first A/D converter 32. The first channel 28-1 also includes a first relay 40, controlled by first microcontroller 36, in a relay circuit 42.

In analogue circuit 30, the redundant second channel 28-2 preferred to the first channel 28-1 comprises a second A/D converter 44, a second microcontroller 46, belonging to digital diagnostic comparator unit 34, for analysing a second signal 48 obtained from the second A/D converter 44, and a second relay 50, controlled by the second microcontroller 46, in relay circuit 42. Positively driven relays, preferably connected in series, are preferably used for relays 40 and 50, so that if one of the relays 40, 50 fails or is incorrectly switched, another relay 40, 50 is still available.

It is preferable that only one photosensor 16 is provided. Photosensor 16 is preferably provided in the form of a photodiode. The anode of the photodiode is preferably connected to the first channel 28-1 and the cathode to the second channel 28-2.

In the event of a fault in one of channels 28-1 and 28-2, a pin of photosensor 16 or of the photodiode is preferably connected from the faulty channel 28-1 or 28-2 to a fixed potential by means of an analogue changeover switch, not shown, to prevent feedback via photosensor 16 from the defective channel 28-1 or 28-2 to the respective other channel 28-1 or 28-2.

Diagnostic comparator unit 34 is configured to perform a comparison, symbolised by double-headed arrow 52, between a first result of analysis from the first microcontroller 36 and a second result of analysis from the second microcontroller 46, and to influence output signal EXTS1, depending on the result of comparison 52.

Diagnostic comparator unit 34 of the embodiment shown in FIG. 2 is also configured to compare a signal obtained from one of the two channels 28-1 and 28-2 with an associated expected value, using both first microcontroller 36 and second microcontroller 46, and optionally to initiate a fail-operational mode of analyser circuit 28, depending on the result of the comparison.

Diagnostic comparator unit 34 is preferably so configured that the fail-operational mode is initiated only if the result of comparison obtained with the aid of both first microcontroller 36 and second microcontroller 46 is that the signal compared with the expected value differs from said expected value, preferably after a predefined tolerance has been taken into account.

Diagnostic comparator unit 34 is preferably so configured that the fail-operational mode is not initiated, but, preferably after a predefined failure tolerance time of preferably about 3 s, analyser circuit 28 triggers a fail stop if the result of comparison, either with the aid of first microcontroller 36 only or with the aid of second microcontroller 46 only, is that the signal compared with the expected value differs from said expected value, preferably after a tolerance has been taken into account.

The signal obtained from one of the two channels 28-1, 28-2 is preferably a signal obtained from the respective A/D converter 32 or 44 in the respective channel 28-1 or 28-2. Alternatively, the signal obtained from one of the two channels 28-1, 28-2 may additionally or alternatively be a signal obtained from the respective relay 40 or 50 of the respective channel 28-1 or 28-2.

Diagnostic comparator unit 34 is preferably so configured that the comparison of a signal obtained from one of the two channels 28-1, 28-2 with an associated expected value can be carried out alternately with a signal obtained from first channel 28-1 and with a signal obtained from second channel 28-2.

Diagnostic comparator unit 34 is preferably configured to maintain a fail-operational mode for a predefined period.

The fail-operational mode of analyser circuit 28 preferably includes analyser circuit 28 operating only in single-channel mode with the other of the two channels 28-1, 28-2. It is further preferred that analyser circuit 28 operates in single-channel mode with the other of the two channels 28-1, 28-2 only if diagnostic comparator unit 34 has classified said other of the two channels 28-1 or 28-2 as fault-free.

Diagnostic comparator unit 34 is preferably so configured that it performs multiple comparisons of a signal obtained from one of the two channels 28-1, 28-2 with an associated expected value, not only with the aid of the first microcontroller 36 but also with the aid of the second microcontroller 46, preferably within a predetermined failure tolerance time, before a result of the comparisons is specified by analyser circuit 28.

Diagnostic comparator unit 34 is preferably so configured that, if it is determined in one of the two channels 28-1, 28-2 that the sensor signal 26 generated by flame sensor 16 does not correspond to a flame 4, it performs the comparison with an associated expected value, preferably exclusively, with a signal obtained from said channel 28-1, 28-2.

A separate power supply, not shown in FIG. 2, is preferably provided for each of the two channels 28-1 and 28-2, at least for their analogue parts in analogue circuit 30.

Figure 3:
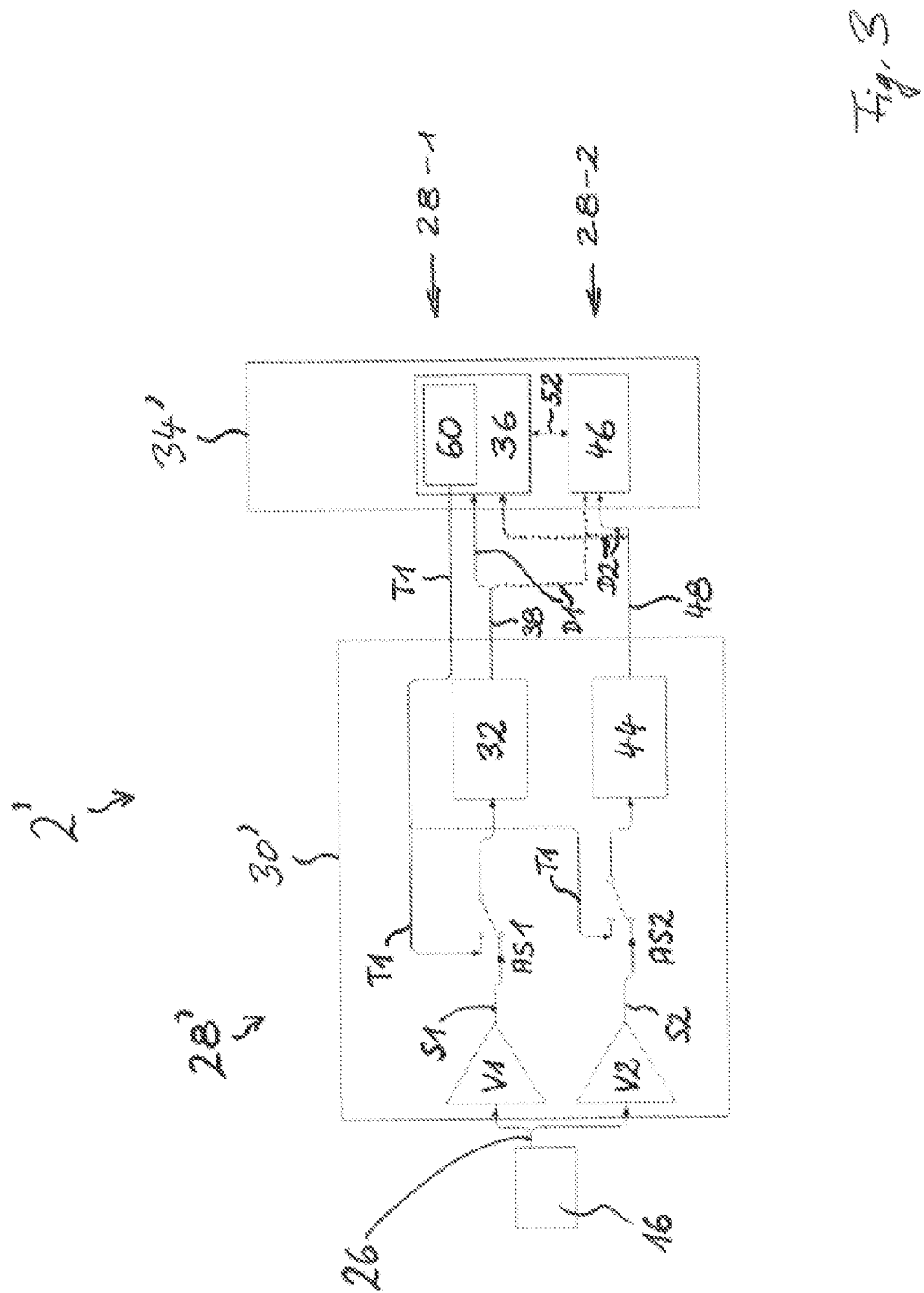
FIG. 3 shows a schematic structure of a second embodiment of a flame monitor.

FIG. 3 shows a schematic structure of a second embodiment of a flame monitor 2'. The structure of flame monitor 2' in the embodiment according to FIG. 3 is identical in its main features to the structure of flame monitor 2 according to FIG. 2. In the embodiment shown in FIG. 3, flame monitor 2' additionally has a first analogue changeover switch AS1 which is arranged upstream in an analogue circuit 30' from the first A/D converter 32 in first channel 28-1 and which is switchable by a diagnostic comparator unit 34'. Flame monitor 2' further comprises a second analogue changeover switch AS2 which is arranged upstream in analogue circuit 30 from the second A/D converter 44 in second channel 28-2 and which is switchable by diagnostic comparator unit 34, In the embodiment shown in FIG. 3, flame monitor 2' further comprises a first amplifier V1, arranged in analogue circuit 30', for conditioning sensor signal 26 into first channel 28-1 for the first A/D converter 32, and a second amplifier V2 arranged in analogue circuit 30' for conditioning the sensor signal 26 into the second channel 28-2 for the second A/D converter 44.

In the switching position of the first analogue changeover switch AS1 as shown in FIG. 3, the first analogue changeover switch AS1 feeds sensor signal 26 to the first A/D converter 32 as a first signal S1 conditioned by amplifier V1. In the switching position shown in FIG. 3, the second analogue changeover switch AS2 likewise feeds sensor signal 26 to the second A/D converter 44 as a second signal S2 conditioned by amplifier V2.

In the embodiment shown in FIG. 3, diagnostic comparator unit 34' is configured to supply the respective A/D converter 32, 44 by switching the first analogue changeover switch AS1 and/or by means of the second analogue changeover switch AS2, preferably for a limited, predefined test period, with a test signal T1 preferably having a predefined amplitude and/or a predefined frequency, instead of the sensor signal 26, for testing said A/D converter 32, 44.

Test signal T1 is preferably generated by one, and further preferably by only one test signal generator 60 in first microcontroller 36.

The diagnostic comparator unit 34' of the embodiment shown in FIG. 3 is configured, in particular, to compare a signal D1 obtained from channel 28-1 with an associated expected value, preferably stored in a memory, not shown, of diagnostic comparator unit 34', with the aid of both the first microcontroller 36 and the second microcontroller 46, and for optional initiation of a fail-operational mode by analyser circuit 28' depending on a result of the comparison after test signal T1 is connected accordingly to channel 28-1 by analogue changeover switch AS1.

The diagnostic comparator unit 34' of the embodiment shown in FIG. 3 is also configured to compare a signal D2 obtained from second channel 28-2 with an associated expected value with the aid of both the first microcontroller 36 and the second microcontroller 46, and for optional initiation of a fail-operational mode by analyser circuit 28' depending on a result of the comparison, as soon as test signal T1 is connected to the A/D converter 44 of second channel 28-2 with the aid of the analogue changeover switch AS2 controlled by diagnostic comparator unit 34'. Like in the embodiment shown in FIG. 2, diagnostic comparator unit 34' is so configured that the fail-operational mode is initiated only if the result of comparison obtained with the aid of both the first microcontroller 36 and the second microcontroller 46 is that the signal D1 compared with the expected value when testing the first channel 28-1 with the aid of test signal T1, or the signal D2 compared with the expected value when testing the second channel 28-2 with the aid of test signal T1 differs from said expected value even after taking a predefined tolerance into account.

Diagnostic comparator unit 34' is preferably configured to compare a signal D1 or D2 obtained from one of the two channels 28-1, 28-2 with an associated expected value, with the aid of both the first microcontroller 36 and the second microcontroller 46, and to use a signal obtained from the respective amplifier V1 or V2 in said channel 28-1 or 28-2 as a signal for optionally initiating a fail-operational mode of analyser circuit 28' depending on a result of said comparison.

In this embodiment, one of the two channels 28-1 or 28-2 is diagnosed with the aid of the separate test signal T1. The respective A/D converter 32 or 44 is tested or diagnosed in accordance with the invention with the aid of said test signal T1. It can either be determined, therefore, that the analogue part of channel 28-1 or 28-2, i.e. the analogue part of channel 28-1 consisting of first amplifier V1 and first A/D converter 32, or the analogue part of channel 28-2 consisting of second amplifier V2 and second A/D converter 44, is fault-free if signal D1 or D2 obtained from the respective A/D converter 32 or 44 matches the associated expected value, or a fail-operational mode can be initiated by analyser circuit 28' if the obtained signal D1 or D2 matches the expected value with the aid of both the first microcontroller and the second microcontroller, even after a tolerance has been deducted. The associated expected value can be a specific test pattern. The expected value or test pattern is preferably exchanged between the two microcontrollers 36 and 46 via internal data exchange, shown by arrow 52, so that both microcontrollers 36 and 46 have identical expected values or identical test patterns.

As in the embodiment shown in FIG. 2, the fail-operational mode of analyser circuit 28' also includes, in a preferred variant, analyser circuit 28' operating only in single-channel mode with the other of the two channels 28-1, 28-2. It is further preferred that analyser circuit 28' operates in single-channel mode with the other of the two channels 28-1, 28-2 only if diagnostic comparator unit 34' has classified said other of the two channels 28-1, 28-2 as fault-free. It is preferred, alternatively, that only the analogue part of the respective channel 28-1 or 28-2 is single-channel, whereas the data analysis of the actual signal S1 or S2 in diagnostic evaluation unit 34' continues to be carried out by both microcontrollers 36 and 46, such that signals D1 and D2 are fed to both microcontrollers 36 and 46 accordingly, as shown in FIG. 3.

For this purpose, the first amplifier V1 is controllable by the first microcontroller 36 via a first drive line, not shown, while the second amplifier V2 is controllable by the second microcontroller 46 via a second drive line, not shown, wherein a status of the first drive line can be monitored by the second microcontroller 46 via a first amplifier readback line, not shown, to the second microcontroller 46, by comparing said status with a first expected status of the drive line, while a status of the second activation control line can be monitored by the first microcontroller via a second amplifier readback line to the first microcontroller by comparing said status with a second expected status of the drive line, and wherein, preferably after a predefined readback failure tolerance time, for example after approximately 3 s, a fail stop is triggered by the analyser circuit, or by outputting an output signal indicating the absence of a flame, if the status of the first drive line differs from the first expected status of the drive line, preferably after taking a tolerance into account, and/or the status of the second drive line differs from the second expected status of the drive line, preferably after taking a tolerance into account.

Figure 4:
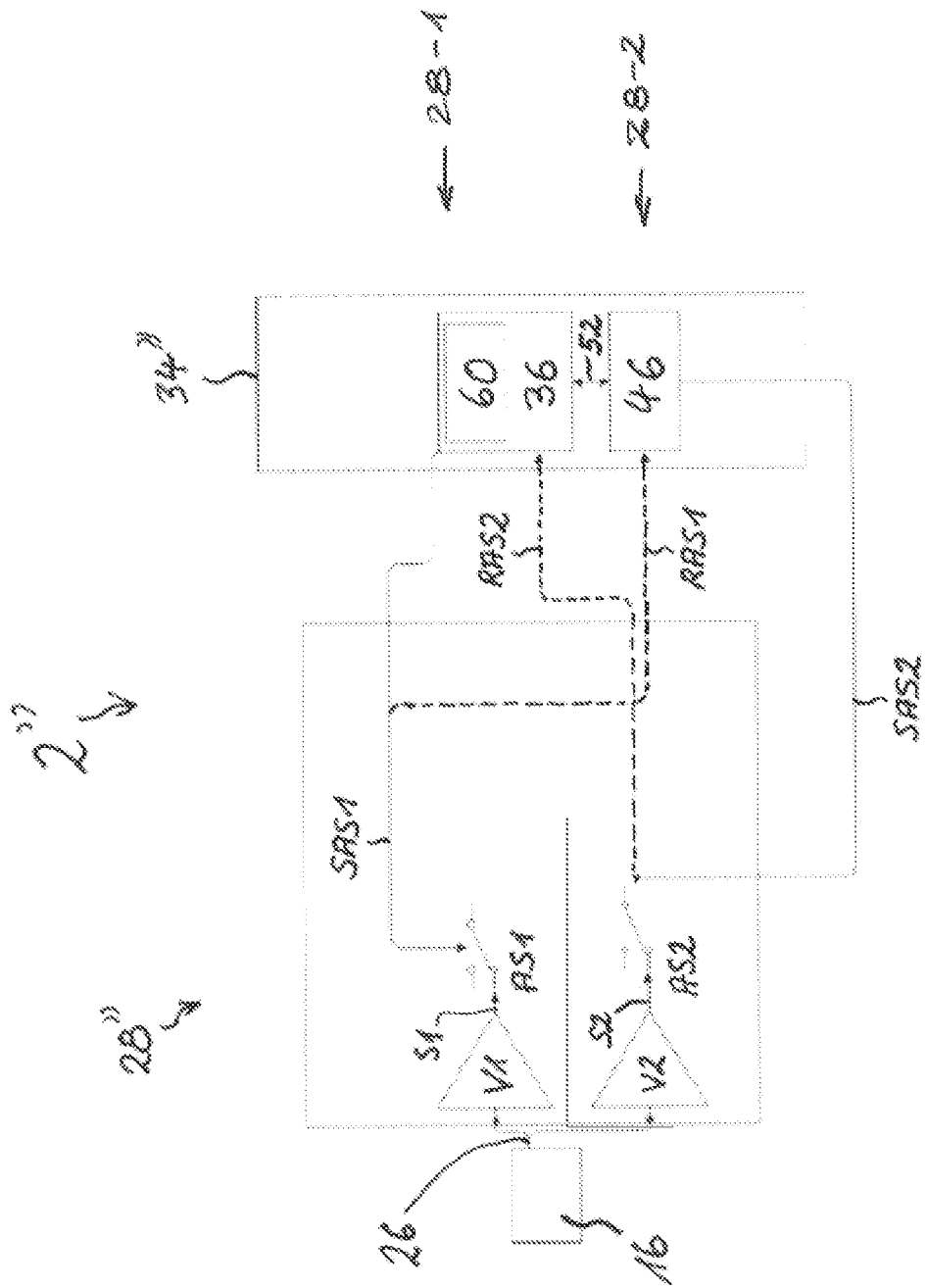
FIG. 4 shows a schematic structure of a third embodiment of a flame monitor.

FIG. 4 shows a schematic structure of a third embodiment of a flame monitor 2". The basic structure of flame monitor 2" in the embodiment according to FIG. 4 is substantially identical to the structure of flame monitor 2' in the second embodiment according to FIG. 3. For the sake of simplicity, FIG. 4 does not show A/D converters 32 and 44.

In the third embodiment of flame monitor 2" as shown in FIG. 4, the first analogue changeover switch AS1 is switchable by the first microcontroller 36 via a first control line SAS1. The second analogue changeover switch AS2 is switchable by the second microcontroller 46 via a second control line SAS2. A status of the first control line SAS1 can be monitored by the second microcontroller 46 via a first readback line RAS1 to the second microcontroller 46 by comparing said status with a first expected status of the control line. A status of the second control line SAS2 can be monitored by the first microcontroller 36 via a second readback line RAS2 to the first microcontroller 36 by comparing said status with a second expected status of the control line.

In the case of flame monitor 2" in the third embodiment according to FIG. 4, a fail stop is triggered by analyser circuit 28", and an output signal EXTS1 indicating the presence or to absence of a flame is generated and outputted, preferably after a predefined readback fault tolerance time of about 3 seconds, for example, if the status of the first control line SAS1 differs from the first expected status of the control line, preferably after taking a tolerance into account, and/or the status of the second control line differs from the second expected status of the control line, preferably after taking a tolerance into account.

A first additional analogue changeover switch controllable by diagnostic comparator unit 34" is provided in first channel 28-1 for disconnecting test signal T1 in FIG. 3, and a second additional analogue changeover switch controllable by diagnostic comparator unit 34" is provided in second channel 28-2 for disconnecting test signal T1. Diagnostic comparator unit 34" is so configured that, before connection of sensor signal 26 after disconnection of test signal T1 in a selected channel 28-1 or 28-2, it checks by means of both microcontrollers 36 and 46 in the selected channel whether test signal T1 has been disconnected and whether the respective additional analogue changeover switch for disconnecting test signal T1 is working in the selected channel 28-1 or 28-2.

Figure 5:
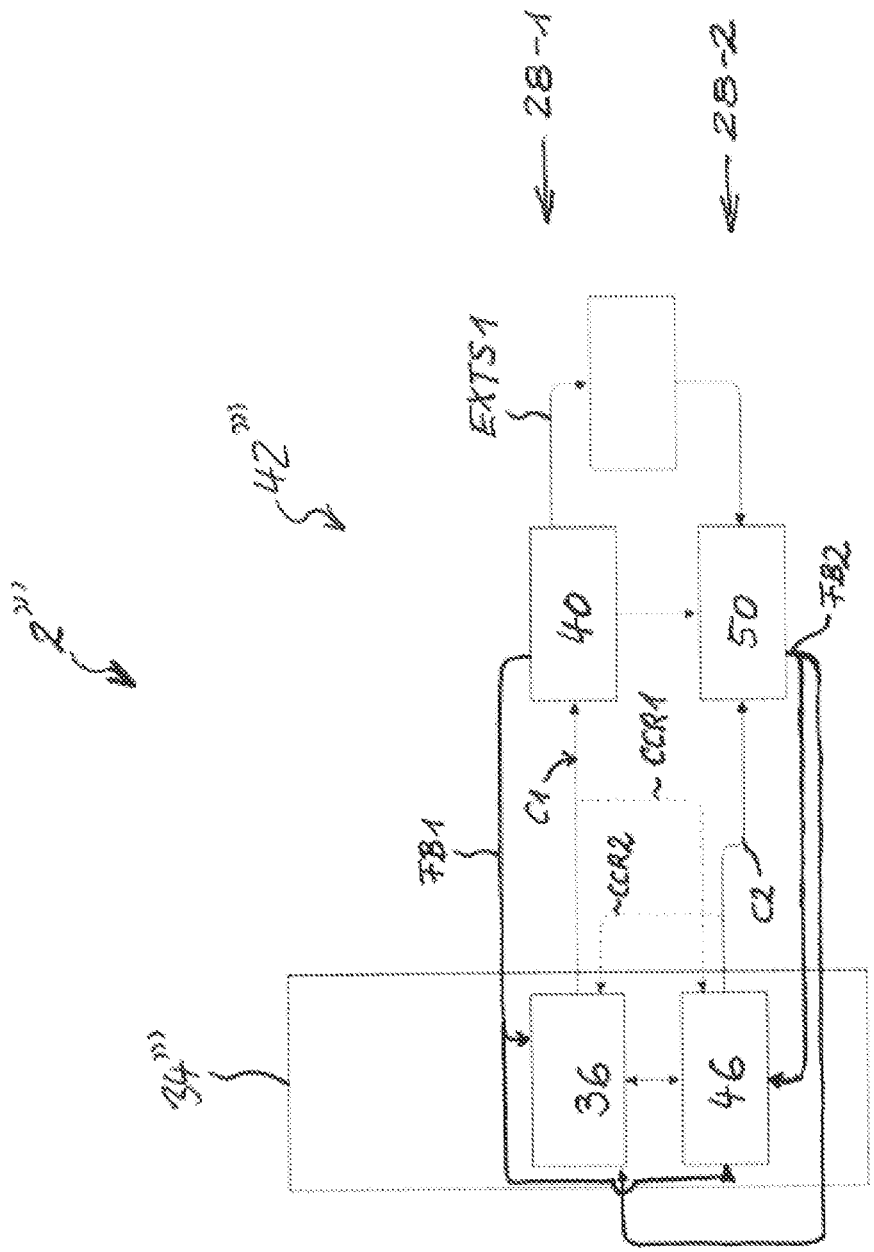
FIG. 5 shows a schematic structure of a fourth embodiment of a flame monitor.

FIG. 5 shows a fourth embodiment of a flame monitor 2''' according to the invention. The flame monitor 2''' shown in the fourth embodiment in FIG. 5 is substantially identical in its basic structure to flame monitor 2 according to the first embodiment shown in FIG. 2. However, flame monitor 2''' may also be identical to one of flame monitors 2' or 2", or it can be a combination of all the embodiments described above. Furthermore, in the view shown in FIG. 5, only diagnostic comparator unit 34''' and relay circuit 42''' are shown, for the sake of simplicity. In the embodiment shown in FIG. 5, a signal obtained from the respective relay 40 or 50 is a signal FB1 or FB2 obtained from a readback contact of the respective relay 40 or 50. In this embodiment, accordingly, diagnostic comparator unit 34''' is configured to compare a signal FB1 or FB2, obtained from one of the two channels 28-1 or 28-2 via a readback contact of the respective relay 40 or 50, with an associated expected value. This is done with the aid of both the first microcontroller 36 and the second microcontroller 46.

In this embodiment also, diagnostic comparator unit 34''' is likewise configured to optionally initiate a fail-operational mode of analyser circuit 28, 28', 28", depending on the result of the comparison.

Diagnostic comparator unit 34''' is so configured that the fail-operational mode is initiated only if the result of comparison obtained with the aid of both the first microcontroller 36 and the second microcontroller 46 is that the signal FB1, FB2 compared with the expected value differs from said expected value, preferably after a tolerance has been taken into account. Diagnostic comparator unit 34''' is preferably so configured that the fail-operational mode is not initiated, but, preferably after a predefined failure tolerance time of about 3 s, for example, a fail stop of analyser circuit 28, 28', 28" is triggered if the result of comparison, either with the aid of first microcontroller 36 only or with the aid of second microcontroller 46 only, is that the signal FB1, FB2 compared with the expected value differs from said expected value, preferably after a tolerance has been taken into account.

In addition, the fourth embodiment in FIG. 5 shows that the first relay 40 is controllable by the first microcontroller 36 via a first relay control line C1. The second relay 50, which is preferably connected in series to the first relay 40, is likewise controllable by the second microcontroller 46 via a second relay control line C2.

In this regard, a status of the first relay control line C1 can be monitored, in the fourth embodiment of flame monitor 2''' shown in FIG. 5, by the second microcontroller 46 via a first relay readback line CCR1 to the second microcontroller 46, by comparing said status with a first expected status of the relay control line. A status of the second relay control line C2 can also be monitored by the first microcontroller 36 via a second relay readback line CCR2 to the first microcontroller 36, by comparing said status with a second expected status of the relay control line. In the fourth embodiment of flame monitor 2''' shown in FIG. 5, a fail stop is triggered by analyser circuit 28, preferably after a predefined readback failure tolerance time, if the status of the first relay control line C1 differs from the first expected status of the relay control line, preferably after taking a tolerance into account, and/or the status of the second relay control line C2 differs from the second expected status of the relay control line, preferably after taking a tolerance into account.

The invention claimed is:

1. A flame monitor for monitoring at least one sub-region of a combustion chamber for the presence of a flame, comprising:
a flame sensor for sensing a physical variable of the flame and for generating an associated electrical sensor signal,
a dual-channel analyser circuit, connected downstream from the flame sensor, for determining whether the associated electrical sensor signal generated by the flame sensor corresponds to the flame and for outputting a safety-oriented output signal indicating the presence or absence of the flame, wherein the dual-channel analyser circuit comprises:
a first channel configured to process the associated electrical sensor signal, said first channel comprising a first analogue-digital converter in an analogue circuit, a first microcontroller belonging to a digital diagnostic comparator unit, for analysing a first signal obtained from the first analogue-digital converter, and a first relay in a relay circuit, which first relay is controlled by the first microcontroller, and
a second channel configured to process the associated electrical sensor signal, said second channel comprising a second analogue-digital converter in the analogue circuit, a second microcontroller belonging to the digital diagnostic comparator unit for analysing a second signal obtained from the second analogue-digital converter, and a second relay in the relay circuit, which second relay is controlled by the second microcontroller, wherein the digital diagnostic comparator unit is configured to compare a first result of analysis from the first microcontroller and a second result of analysis from the second microcontroller and to influence the safety-oriented output signal depending on the result of the comparison, wherein the digital diagnostic comparator unit is configured to compare a signal obtained from one of the first and second channels with an associated expected value, with the aid of both the first microcontroller and the second microcontroller.

2. The flame monitor according to claim 1, wherein the digital diagnostic comparator unit is so configured that the fail-operational mode is initiated only if the result of comparison obtained with the aid of both the first microcontroller and the second microcontroller is that the signal compared with the expected value differs from said expected value after a tolerance has been taken into account.

3. The flame monitor according to claim 1, wherein the digital diagnostic comparator unit is so configured that the fail-operational mode is not initiated, but, after a predefined failure tolerance time a fail stop of the dual-channel analyser circuit is triggered if the result of comparison, either with the aid of the first microcontroller only or with the aid of the second microcontroller only, is that the signal compared with the expected value differs from said expected value after a tolerance has been taken into account.

4. The flame monitor according to claim 1, wherein the signal obtained from one of the first and second channels is a signal obtained from the analogue-digital converter in said one of the first and second channels.

5. The flame monitor according to claim 4, comprising a first analogue changeover switch arranged upstream in the analogue circuit from the first analogue-digital converter in the first channel and switchable by the digital diagnostic comparator unit, and further comprising a second analogue changeover switch arranged upstream in the analogue circuit from the second analogue-digital converter in the second channel and switchable by the digital diagnostic comparator unit, wherein the digital diagnostic comparator unit is configured to supply the analogue-digital converter, by switching the first and/or the second analogue changeover switch for a limited, predefined test period, with a test signal having a predefined amplitude and/or a predefined frequency, instead of the associated electrical sensor signal, for testing said analogue-digital converter.

6. The flame monitor according to claim 5, wherein the first analogue changeover switch is switchable by the first microcontroller via a first control line, the second analogue changeover switch is switchable by the second microcontroller via a second control line, a status of the first control line is monitorable by the second microcontroller via a first readback line to the second microcontroller by comparing said status with a first expected status of the first control line, a status of the second control line is monitorable by the first microcontroller via a second readback line to the first microcontroller by comparing said status with a second expected status of the second control line, and
wherein after a predefined readback failure tolerance time, a fail stop of the dual-channel analyser circuit is triggered if the status of the first control line differs from the first expected status of the first control line after taking a tolerance into account, and/or the status of the second control line differs from the second expected status of the second control line after taking a tolerance into account.

7. The flame monitor according to claim 5, wherein a first additional analogue changeover switch controllable by the digital diagnostic comparator unit is provided in the first channel for disconnecting the test signal in the first channel, and a second additional analogue changeover switch controllable by the digital diagnostic comparator unit is provided in the second channel for disconnecting the test signal in the second channel.

8. The flame monitor according to claim 7, wherein the digital diagnostic comparator unit is configured to check, before connection of the associated electrical sensor signal after disconnection of the test signal in a selected channel, by means of both the first and second microcontrollers, whether the test signal has been disconnected in the selected channel and whether the respective additional analogue changeover switch for disconnecting the test signal is working in the selected channel.

9. The flame monitor according to claim 1, wherein the signal obtained from one of the first and second channels is a signal obtained from the relay in said one of the first and second channels.

10. The flame monitor according to claim 9, wherein the signal obtained from the relay is a signal obtained from a readback contact of the relay.

11. The flame monitor according to claim 1, wherein the first relay is switchable by the first microcontroller via a first relay control line, the second relay, which is connected in series to the first relay, is controllable by the second microcontroller via a second relay control line, a status of the first relay control line is monitorable by the second microcontroller via a first relay readback line to the second microcontroller by comparing said status with a first expected status of the first relay control line, a status of the second relay control line is monitorable by the first microcontroller via a second relay readback line to the first microcontroller by comparing said status with a second expected status of the second relay control line, and wherein after a predefined readback failure tolerance time, a fail stop of the dual-channel analyser circuit is triggered if the status of the first relay control line differs from the first expected status of the first relay control line after taking a tolerance into account, and/or the status of the second relay control line differs from the second expected status of the second relay control line after taking a tolerance into account.

12. The flame monitor according to claim 1, comprising a first amplifier arranged in the analogue circuit for conditioning the associated electrical sensor signal in the first channel for the first analogue-digital converter and further comprising a second amplifier arranged in the analogue circuit for conditioning the associated electrical sensor signal in the second channel for the second analogue-digital converter, wherein the signal obtained from one of the first and second channels is a signal obtained from the amplifier in said one of the first and second channels.

13. The flame monitor according to claim 12, wherein the first amplifier is controllable by the first microcontroller via a first drive line, the second amplifier is controllable by the second microcontroller via a second drive line, a status of the first drive line is monitorable by the second microcontroller via a first amplifier readback line to the second microcontroller by comparing said status with a first expected status of the first drive line, a status of the second drive line is monitorable by the first microcontroller via a second amplifier readback line to the first microcontroller by comparing said status with a second expected status of the second drive line, and wherein after a predefined readback failure tolerance time, a fail stop of the dual-channel analyser circuit is triggered if the status of the first drive line differs from the first expected status of the first drive line after taking a tolerance into account, and/or the status of the second drive line differs from the second expected status of the second drive line after taking a tolerance into account.

14. The flame monitor according to claim 1, wherein the digital diagnostic comparator unit is so configured that the comparison of a signal obtained from one of the first and second channels with an associated expected value is carried out alternately with a signal obtained from the first channel and with a signal obtained from the second channel.

15. The flame monitor according to claim 1, wherein the digital diagnostic comparator unit is configured to maintain the fail-operational mode for a predefined period.

16. The flame monitor according to claim 12, wherein the fail-operational mode includes the dual-channel analyser circuit operating only in single-channel mode with the other of the first and second channels, or the fail-operational mode includes only an analogue part of the respective channel, comprising the amplifier and the A/D converter, being in single-channel mode, while the data analysis of the actual signal in the digital diagnostic comparator unit continues to be carried out by both the first and second microcontrollers, such that the signals originating from said analogous parts of the respective channel are fed to both the first and second microcontrollers for analysis.

17. The flame monitor according to claim 16, wherein the dual-channel analyser circuit operates only in single-channel mode with the other of the first and second channels only if the digital diagnostic comparator unit has classified said other of the first and second channels as fault-free.

18. The flame monitor according to claim 1, wherein the digital diagnostic comparator unit is configured for multiple comparisons of a signal obtained from one of the first and second channels with an associated expected value, with the aid of both the first microcontroller and the second microcontroller within a predetermined failure tolerance time before a result of the comparisons is specified.

19. The flame monitor according to claim 1, wherein the digital diagnostic comparator unit is so configured that, if it is determined in one of the first and second channels that the associated electrical sensor signal generated by the flame sensor does not correspond to a flame, the digital diagnostic comparator unit performs the comparison with an associated expected value exclusively, using a signal obtained from said one of the first and second channels.

20. The flame monitor according to claim 1, wherein a separate power supply is provided for each of the first and second channels, at least for their analogue parts.

21. A combustion chamber having a flame monitor according to claim 1.

22. A method for monitoring at least one sub-region of a combustion chamber for the presence of a flame, said method comprising the steps of:
sensing by means of a flame sensor a physical variable of a flame and generating an associated electrical sensor signal,
determining by means of a dual-channel analyser circuit connected downstream from the flame sensor whether the associated electrical sensor signal generated by the flame sensor corresponds to a flame, and outputting a safety-oriented output signal indicating the presence or absence of a flame,
processing the associated electrical sensor signal in a first channel of the dual-channel analyser circuit by means of a first analogue-digital converter in an analogue circuit, a first microcontroller belonging to a digital diagnostic comparator unit for analysing a first signal obtained from the first analogue-digital converter, and by means of a first relay, controlled by the first microcontroller, in a relay circuit, and
processing the associated electrical sensor signal in a second channel of the dual-channel analyser circuit by means of a second analogue-digital converter in the analogue circuit, a second microcontroller belonging to the digital diagnostic comparator unit, for analysing a second signal obtained from the second analogue-digital converter, and by means of a second relay in the relay circuit, wherein the second relay is controlled by the second microcontroller, comparing a first result of analysis from the first microcontroller and a second result of analysis from the second microcontroller, and influencing the safety-oriented output signal, depending on the result of the comparison, and comparing a signal obtained from one of the first and second channels with an associated expected value, with the aid of both the first microcontroller and the second microcontroller.

* * * * *